United States Patent
Rossman et al.

(10) Patent No.: US 6,176,042 B1
(45) Date of Patent: Jan. 23, 2001

(54) GATE UNLOCKING

(75) Inventors: Jon R. Rossman, Chelmsford; Bryan R. Hotaling, Arlington, both of MA (US)

(73) Assignee: The First Years Inc., Lake Forest, CA (US)

( * ) Notice: Under 35 U.S.C. 154(b), the term of this patent shall be extended for 0 days.

(21) Appl. No.: 09/293,010

(22) Filed: Apr. 16, 1999

(51) Int. Cl.$^7$ ...................................................... E06B 3/32
(52) U.S. Cl. ............................... 49/463; 49/57; 160/210; 292/170; 292/255
(58) Field of Search .................................... 49/50, 55, 57, 49/463, 465, 394, 395, 272, 273, 274, 263, 264; 292/255, 170, 302; 160/210

(56) References Cited

U.S. PATENT DOCUMENTS

| | | |
|---|---|---|
| D. 355,261 | 2/1995 | Abrams et al. ........................ D25/38 |
| 1,416,651 | 5/1922 | Lanfair . |
| 2,928,146 | 3/1960 | Kuniholm ................................ 20/71 |
| 3,581,438 | 6/1971 | Treiber .................................... 49/274 |
| 4,492,263 | 1/1985 | Gebhard ................................. 160/228 |
| 4,566,223 | 1/1986 | Romberg ................................. 49/264 |
| 4,569,546 | 2/1986 | Howard et al. ................... 292/336.3 |
| 4,583,715 | 4/1986 | Wright .................................... 256/24 |
| 4,611,431 | * 9/1986 | Lauro .................................. 49/57 X |
| 4,621,848 | 11/1986 | Pierce ................................. 292/336.3 |
| 4,669,521 | 6/1987 | Barnes et al. ......................... 160/136 |
| 4,677,791 | 7/1987 | Larson et al. ........................... 49/463 |
| 4,685,247 | 8/1987 | Alam ........................................ 49/55 |
| 4,787,174 | 11/1988 | Brown ...................................... 49/55 |
| 4,852,194 | 8/1989 | Langan ..................................... 5/427 |
| 4,884,614 | 12/1989 | Spurling ................................. 160/225 |
| 4,944,117 | 7/1990 | Gebhard et al. ......................... 49/55 |
| 5,060,421 | 10/1991 | Castelli ................................... 49/463 |
| 5,117,585 | 6/1992 | Andrisin, III ............................ 49/55 |
| 5,152,508 | 10/1992 | Fish ........................................ 256/24 |
| 5,193,863 | 3/1993 | McBain ................................. 292/255 |
| 5,272,840 | 12/1993 | Knoedler et al. ....................... 49/463 |
| 5,360,191 | 11/1994 | Carson et al. ..................... 248/218.4 |
| 5,367,829 | 11/1994 | Crossley et al. ........................ 49/465 |
| 5,396,732 | 3/1995 | Andersen ................................. 49/55 |
| 5,442,881 | 8/1995 | Asbach et al. ......................... 49/465 |
| 5,457,914 | 10/1995 | Johnson, Jr. ........................... 49/463 |
| 5,533,715 | 7/1996 | Dandrea ................................. 256/45 |
| 5,553,833 | 9/1996 | Bohen ..................................... 256/65 |
| 5,617,674 | 4/1997 | Terrill ...................................... 49/55 |
| 5,622,416 | * 4/1997 | Rainey et al. .................... 49/263 X |
| 5,655,798 | 8/1997 | Kaveney et al. ......................... 292/3 |
| 5,657,809 | 8/1997 | Longoria et al. .................... 160/369 |
| 5,782,039 | 7/1998 | Scherer et al. ......................... 49/465 |
| 5,809,694 | * 9/1998 | Postans .................................... 49/57 |
| 5,890,320 | * 4/1999 | Anderson .............................. 49/465 |

FOREIGN PATENT DOCUMENTS

| | | | |
|---|---|---|---|
| 2058186 | * 4/1981 | (GB) | ........................................ 49/57 |
| 2 193 992 | 2/1988 | (GB) . | |

* cited by examiner

*Primary Examiner*—Jerry Redman
(74) *Attorney, Agent, or Firm*—Fish & Richardson P.C.

(57) ABSTRACT

An apparatus includes a pair of frame members adapted for mounting to opposing surfaces of a passageway. A door is mounted to at least one of the frame members for movement between a closed position, in which the door and frame members substantially traverse the passageway, and an open position, in which a portion of the passageway is free of the door and frame members, the portion being large enough to permit passage of an adult therethrough. A lock is coupled to at least one of the frame members and adapted to retain the door in the closed position, the lock including an actuator adapted to release the lock to permit movement of the door from the closed position toward the open position upon application to the actuator of a force of at least a predetermined weight of a child.

23 Claims, 7 Drawing Sheets

GATE UNLOCKING

BACKGROUND OF THE INVENTION

The invention relates to gates and in particular unlocking of gates.

Gates are useful to inhibit undesired access through the gate while permitting relatively easy access if desired. Child safety gates are useful to help prevent injuries to children by inhibiting access through the gate by a child while permitting easy access through the gate by an adult. These gates can be mounted, e.g., in doorways, in hallways, between a wall and a stairway railing, or between two stairway railings (such as on a deck). With the gate in place, children are inhibited from accessing areas that are undesirable for the child to access. For example, it may be desirable to inhibit a child from accessing a kitchen, where toxic cleaners may be stored, or a stairway that the child may fall down. Safety gates can also inhibit children from gaining access to a pet or vice versa. A door of the gate can permit access if the door is moved to provide a passageway through the gate.

SUMMARY OF THE INVENTION

The invention provides a mechanism to guard against children undesirably opening a gate and also provides hands-free unlocking and opening of a gate. Among other uses the invention is highly effective in providing an obstruction to help prevent children or animals from accessing an area that it is undesirable for the child or animal to access. For example the invention can be used to block a doorway, hallway or other passageway.

In general, in one aspect, the invention provides an apparatus including a pair of frame members adapted for mounting to opposing surfaces of a passageway. A door is mounted to at least one of the frame members for movement between a closed position, in which the door and frame members substantially traverse the passageway, and an open position, in which a portion of the passageway is free of the door and frame members, the portion being large enough to permit passage of an adult therethrough. A lock is coupled to at least one of the frame members and adapted to retain the door in the closed position, the lock including an actuator adapted to release the lock to permit movement of the door from the closed position toward the open position upon application to the actuator of a force of at least a predetermined weight of a child.

Implementations of this aspect of the invention may include one or more of the following features. The actuator is disposed near a bottom portion of a frame member when the pair of frame members are mounted to the opposing surfaces. The predetermined weight is approximately 40 pounds. The lock is adapted to couple a frame member to the door near both a top of the door and a bottom of the door.

The actuator is adapted to move a recess camming surface, defining a portion of a recess, relative to and against a detent camming surface, of a detent that is biased into the recess when the door is in the closed position and the lock is in a locked position, to substantially remove the detent from the recess. The door is pivotally mounted to the frame about a pivot axis and the detent is a pin that is biased radially outward from the pivot axis. A substantially U-shaped frame includes the frame members and a cross member, the frame members being first and second arms forming sides of the U and the cross member connecting the arms and forming a bottom of the U, the door being pivotally attached to the first arm, and the actuator includes a bracket slidably carried by the second arm and including the recess camming surface. The door includes another pin, and the actuator includes a foot pedal, coupled to the bracket and movably mounted to the frame, including a foot pedal camming surface that provides a wall of a foot pedal recess and that moves relative to and against a pin camming surface, of the another pin that is biased radially outward from the pivot axis and into the foot pedal recess when the door is in the closed position and the lock is in the locked position, to substantially remove the another pin from the foot pedal recess when the foot pedal moves relative to the frame. The arms extend away from the cross member and away from each other.

In general, in another aspect, the invention provides a safety gate for use in a doorway, hall, or the like. The safety gate includes a substantially U-shaped frame having first and second arms connected by a cross member, the frame providing a passageway between the arms above the cross member. A bracket is movably coupled to the second arm and provides a bracket recess, a part of the bracket recess being provided by a bracket camming surface. A foot pedal is coupled to the bracket and movably coupled to the frame near the bottom end of the second arm. A spring is coupled to the foot pedal and requires a predetermined force to change a length of the spring. A door is pivotally mounted to the first arm along a pivot axis and includes a pin biased away from the pivot axis and configured to be received by the bracket recess, the door substantially preventing an infant from passing through the passageway when the pin is received by the bracket recess. When the foot pedal is moved toward a bottom of the frame in a gate-opening direction, the bracket camming surface bears against the pin to move the pin substantially out of the bracket recess.

Implementations of this aspect of the invention may include one or more of the following features. The predetermined force is about a weight of a three-year-old child. The passageway extends from a first side of the frame to a second side of the frame, and a portion of the foot pedal is disposed on the first side of the frame and another portion of the foot pedal is disposed on the second side of the frame. The first and second arms are adapted to engage opposing surfaces and extend from the cross member and away from each other such that when the arms are coupled to the surfaces such that the arms extend substantially perpendicular to the cross member, a force of less than about 40 pounds applied to the gate is insufficient to slide either arm relative to a respective one of the surfaces.

The bracket and the foot pedal are slidably carried by the second arm. The pin is a first pin, the foot pedal provides a foot pedal recess, partially provided by a foot pedal camming surface, the door includes a second pin biased away from the pivot axis and configured to be received by the foot pedal recess, and when the foot pedal slides relative to the frame in the gate-opening direction, the foot pedal camming surface bears against the second pin to move the second pin substantially out of the foot pedal recess.

In general, in another aspect, the invention provides an apparatus for use with a door movably mounted to a frame member between an open position and a closed position. The apparatus is adapted to inhibit the door from moving from the closed position toward the open position while in a locked position and to change to an unlocked position to permit the door to move from the closed position toward an open position if a force of at least a predetermined weight of a child is applied to the apparatus.

Implementations of this aspect of the invention may include one or more of the following features.

The door includes a door member having a door member camming surface and the apparatus includes an apparatus camming surface. The apparatus is further adapted to move the apparatus camming surface relative to the door when the force is applied to the apparatus and to remain substantially fixed relative to the door otherwise. The apparatus camming surface is configured and disposed to cause one of the camming surfaces, biased into a recess provided at least partially by the other camming surface, to be substantially removed from the recess. A portion of the apparatus is adapted to be slidably carried by the frame. The apparatus includes a bracket, slidably coupled to the frame, and an actuator to which the force is applied, the bracket including the apparatus camming surface. The recess is a first recess, the member is a first member, and the member camming surface is a first member camming surface, and the actuator includes an actuator camming surface configured and disposed to cause one of the actuator camming surface and a second member camming surface of a second member of the door, biased into a second recess provided at least partially by the other one of the actuator camming surface and the second member camming surface, to be substantially removed from the second recess when the force is applied to the apparatus. The apparatus comprises a foot pedal to which the force is applied.

Various aspects of the invention may provide one or more of the following advantages. A gate can be unlocked in a hands-free manner. A gate can also be unlocked and opened in a hands-free manner. Accidental opening of a gate can be guarded against. Undesired opening of a gate by a child or an animal such as a pet can also be guarded against.

DESCRIPTION OF PREFERRED EMBODIMENTS

Figure 1:
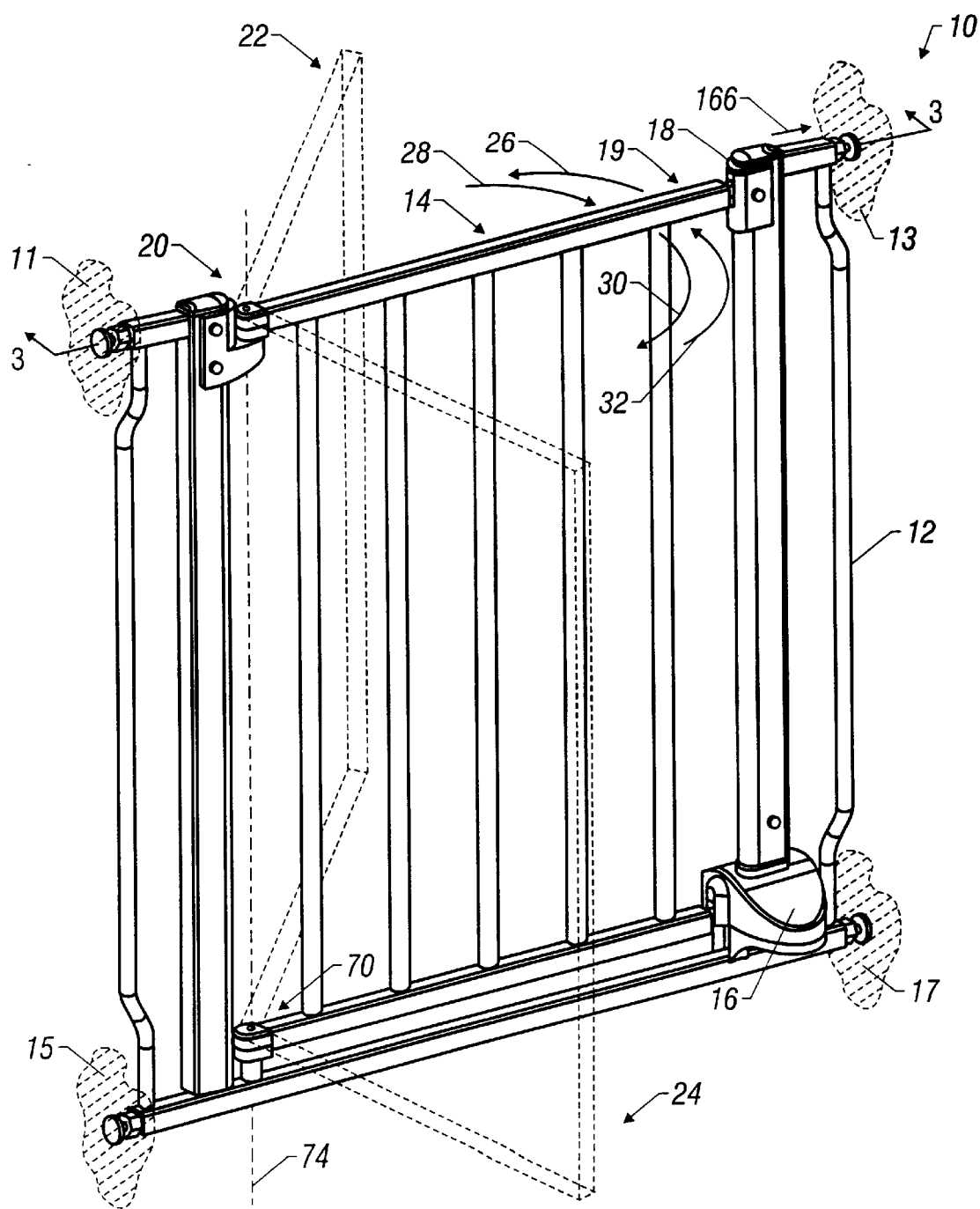
FIG. 1 is a perspective view of an assembled safety gate, in a closed position, according to the invention.

As shown in FIG. 1, a gate 10 includes a frame 12, a door 14, a foot pedal 16, and a bracket 18. The gate 10 is adapted to be mounted between opposing surfaces 11, 13, 15, and 17, e.g., opposing sides of a doorway, walls of a hallway, or railings of a stairwell. With door 14 in a closed position 19 (as shown), frame 12 and door 14 are sized to substantially block the passageway in which gate 10 is disposed. When disposed in the passageway, gate 10 provides spaces between bars of the frame 12 and door 14, and between frame 12 and the surfaces between which gate 10 is disposed, that are too small for children to fit through. Door 14 is pivotally mounted to frame 12 by an upper hinge 20 and a lower hinge 70 along a pivot axis 74. Thus, door 14 can be pivoted from closed position 19, shown in solid lines, to open positions such as open positions 22 and 24 indicated in simplified form with dashed lines. Positions 22 and 24 are not necessarily fully-open position. Door 14 can be pivoted from the closed position 19 in a direction 26 toward open position 22 and in a direction 28 from open position 22 toward closed position 19. Similarly, door 14 can be pivoted in a direction 30 from a closed position 19 toward open position 24 and in a direction 32 from open position 24 toward closed position 19. Foot pedal 16 and bracket 18 provide a locking and unlocking mechanism as described below.

Figure 2:
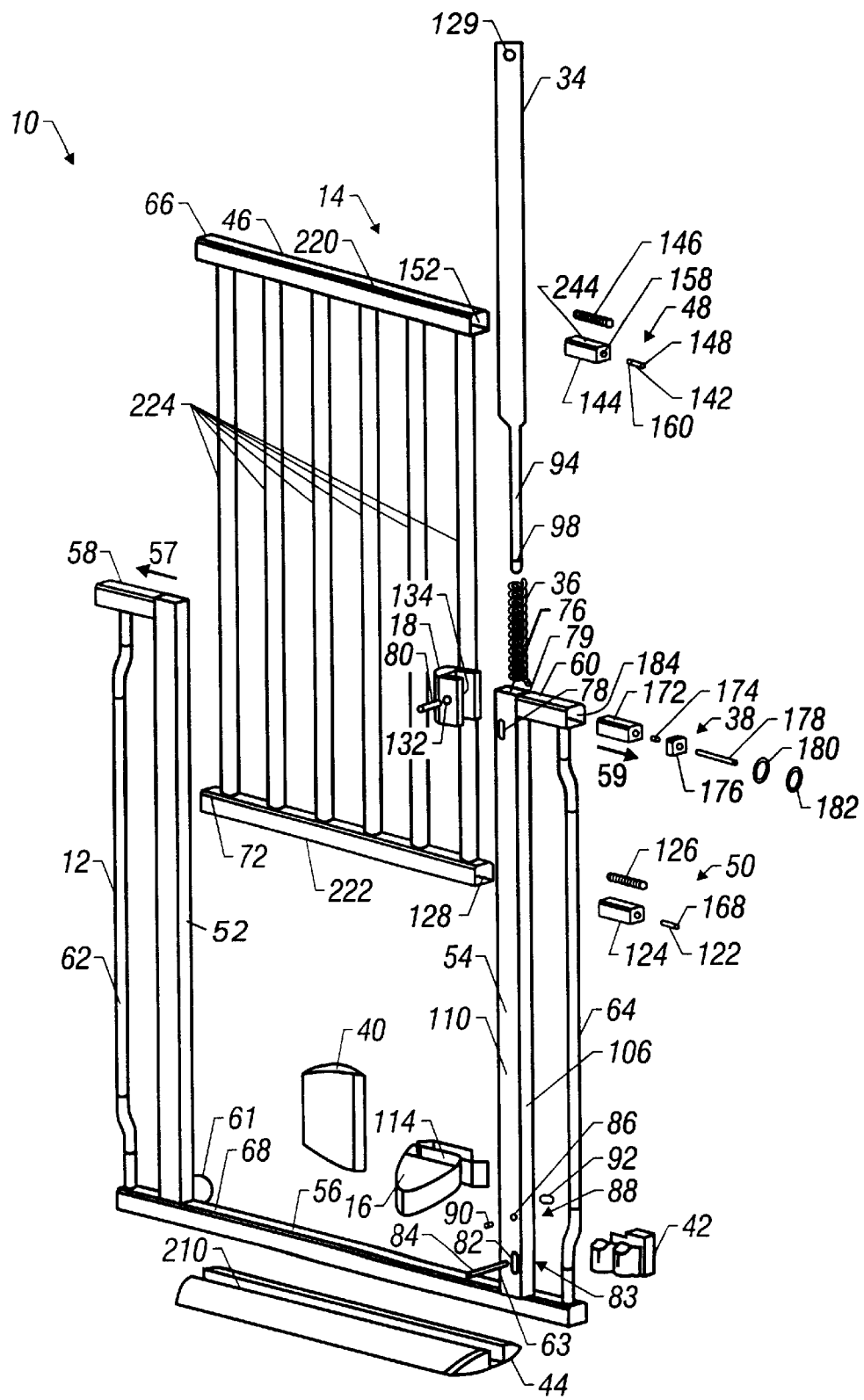
FIG. 2 is an exploded perspective view of some of the components of the safety gate shown in FIG. 1.

As shown in FIG. 2 (that shows some but not all components of gate 10), gate 10 includes components in addition to frame 12, door 14, foot pedal 16, and bracket 18. Gate 10 also includes a linkage 34, a bias spring 36, a mounting assembly 38, a pad 40, a foot pedal support 42, and a frame support 44. Door 14 includes a barrier 46, an upper assembly 48 and a lower assembly 50.

Frame 12 is substantially U-shaped with two hollow D-shaped arms 52 and 54 connected at their respective bottoms by a cross member 56. Arms 52 and 54 are also connected to cross member 56 through two extensions 58 and 60 and two bars 62 and 64, respectively. Arms 52 and 54 and bars 62 and 64 extend away from cross member 56, and slightly outward, away from each other, in directions 57 and 59. Angles 61 and 63 between arms 52 and 54 and cross member 56 are slightly greater than 90°. Arms 52 and 54 are angled outwardly to provide a spring force such that a predetermined force is needed to move arms 52 and 54 inward to extend perpendicularly from cross member 56. The predetermined force is selected to secure gate 10 between surfaces 11 and 13 and to inhibit children from overcoming the friction produced between gate 10 and surfaces 11 and 13. Bars 62 and 64 are shaped and disposed to provide gate 10 with an appropriate width for substantially filling a passageway having a width between about 29 inches and about 34 inches. For example, bars 62 and 64 can provide a width of about 29 inches for frame 12. The top of arm 52 is adapted to receive hinge 20 (FIG. 1) for pivotal connection to door 14 at an upper pivot point 66 of barrier 46. Cross member 56 provides a hole 68 for receiving hinge 70 (FIG. 1) for pivotal coupling to door 14 at a lower pivot point 72 of barrier 46 such that door 14 can be pivotally coupled to frame 12 along pivot axis 74 (FIG. 1). Arm 54 is shaped to receive spring 36 and linkage 34 in an opening 76 that extends along the length of arm 54. Upper slots 78 and 79 (only slot 78 shown) in arm 54 are sized to receive a rivet 80 and lower slots 82 and 83 (only slot 82 shown) are sized to receive a rivet 84. Holes 86 and 88 (only hole 86 is shown) are sized to receive pins 90 and 92, respectively. Pins 90 and 92 can extend into, but not all the way through, opening 76 of arm 54.

Figure 3:
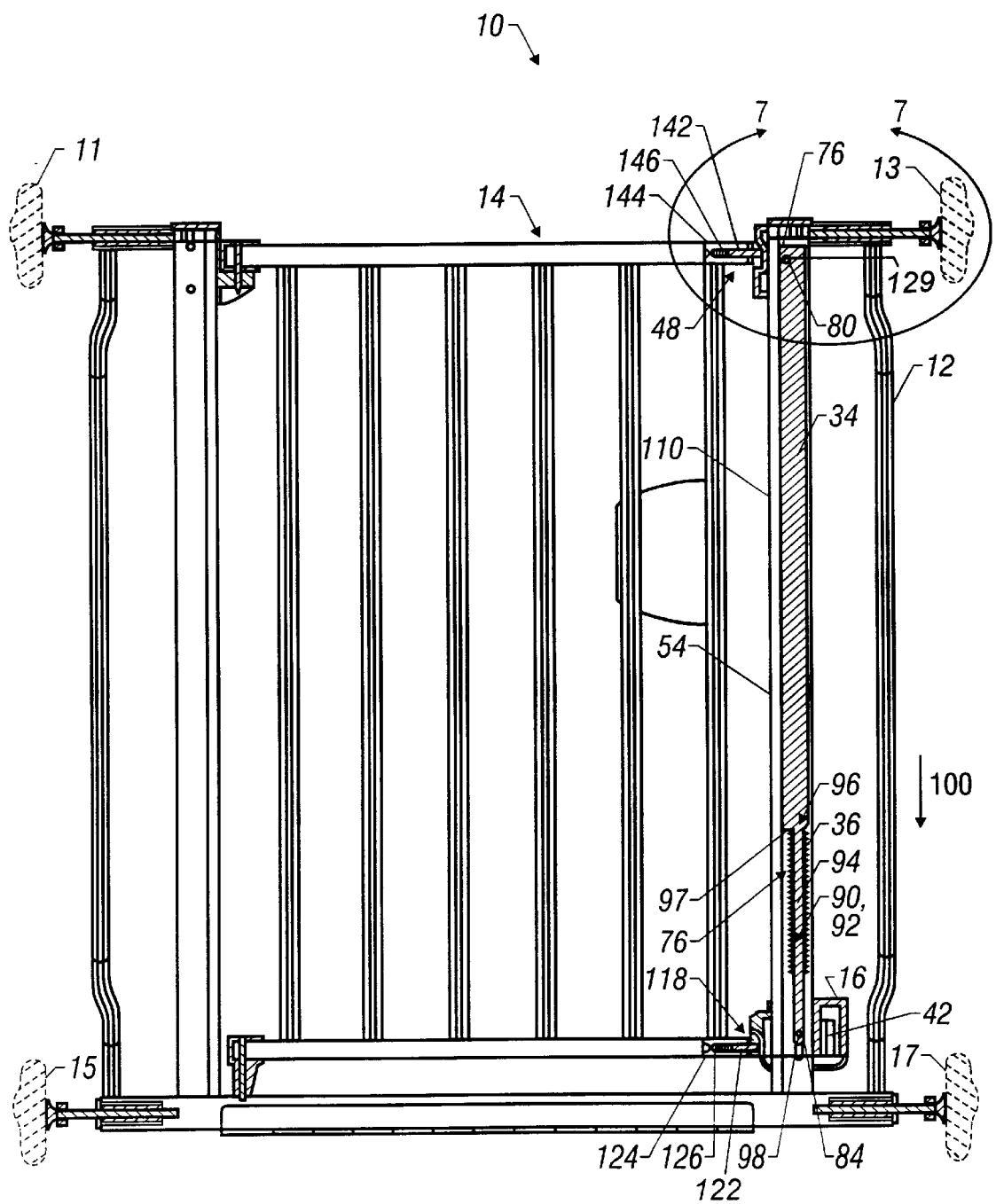
FIG. 3 is a cross-sectional view of the safety gate shown in FIG. 1 taken along line 3—3 shown in FIG. 1.

Referring to FIGS. 2 and 3, spring 36 and linkage 34 are received in opening 76 of arm 54, with spring 36 resting on pins 90 and 92 (indicated by dashed lines in FIG. 3). A lower portion 94 of linkage 34 is received by an interior 96 of spring 36. A ledge 97 of linkage 34 rests on top of spring 36. Spring 36 is configured such that with linkage 34 resting on top of spring 36 and attached to foot pedal 16 and foot pedal support 34, a predetermined force is required to be exerted downwardly on linkage 34 as indicated by arrow 100 to compress spring 36. This predetermined force is preferably greater than a typical weight of a three year old child, e.g., approximately 40 pounds.

Figure 4:
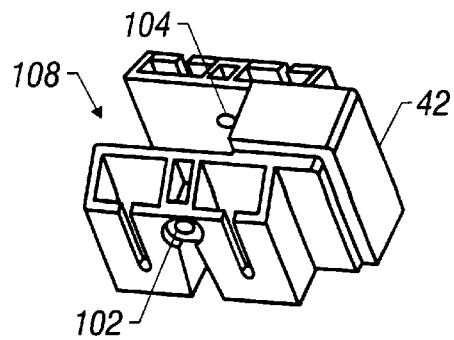
FIG. 4 is a top perspective view of a foot pedal support shown in FIG. 2.

Referring also to FIG. 4, linkage 34 is connected to foot pedal support 42 by rivet 84. Support 42 provides holes 102 and 104 for receiving rivet 84. Support 42 is configured to fit over a flat side 106 (FIG. 2) of D-shaped arm 54, with arm 54 being received by a recess 108 of support 42.

Figure 5:
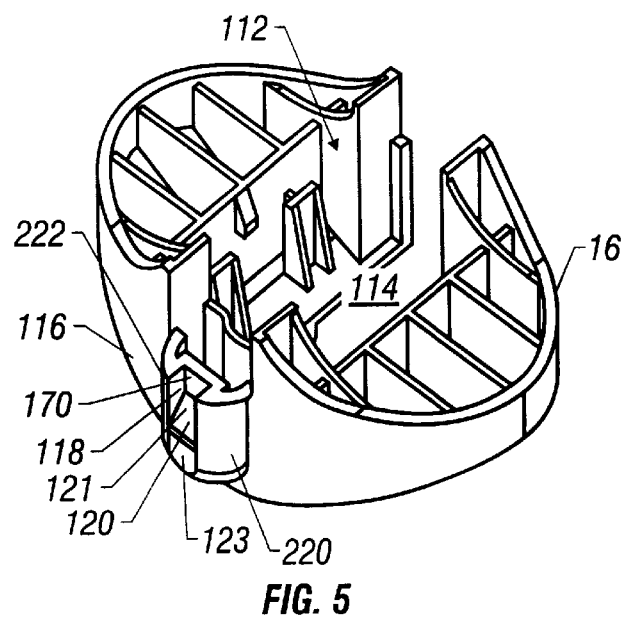
FIG. 5 is a bottom perspective view of a foot pedal shown in FIGS. 1 and 2.

As shown in FIGS. 2 and 5, foot pedal 16 is configured to fit over a rounded side 110 of D-shaped arm 54 and to couple to pedal support 42 (FIG. 4). Pedal 16 is adapted to receive support 42 in a recess 112 and to snap on to support 42. A U-shaped opening 114 in the top of the pedal 16 is shaped to slidably receive curved side 110 of arm 54. On the outside of a closed end 116 of pedal 16, a recess 118 is provided by several walls of pedal 16. One of these walls is an angled wall 120 that provides a camming surface 121, connected to a flat surface 123, for engaging and interacting with a camming surface 168 of a pin 122 of lower assembly 50 (FIG. 2).

As shown in FIGS. 2 and 3, lower assembly 50 includes pin 122, a cap 124, and a spring 126. Pin 122 as shown has a cylindrical shape, but other types of shapes, such as rectangular, are acceptable. Cap 124 is adapted to receive spring 126 and pin 122 and to be received by a hollow end 128 of barrier 46. When gate 10 is assembled, pin 122 is biased by spring 126 to be received by recess 118 (FIGS. 3 and 5) of pedal 16. Assembly 50 is similar to assembly 48 which will be described in more detail below.

Figure 6:
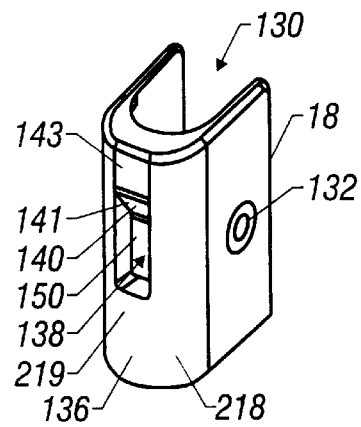
FIG. 6 is a perspective view of a bracket shown in FIGS. 1 and 2.

Referring also to FIG. 6, a hole 128 in linkage 34 receives rivet 80 that couples linkage 34 through slots 78 and 79 in arm 54 to bracket 18. Bracket 18 receives rivet 80 in two holes 132 and 134 (only hole 132 shown in FIG. 6). The bracket 18 provides a U-shaped recess 130 adapted to fit over curved side 110 of arm 54. On the outside of a rounded end 136, bracket 18 provides a recess 138. Recess 138 is provided by several walls, including a wall 140 that provides an angled camming surface 141 and is connected to a flat surface 143. Recess 138 is shaped such that when bracket 18 is received by rounded side 110 of arm 54, bracket 18 can slide along the length of arm 54.

Bracket 18 is guided for sliding along the length of arm 54 by arm 54 and rivets 84 and 80 received by slots 82 and 83, and 78 and 79, respectively. Slots 82, 83 and 78, 79 limit the range of motion of rivets 84 and 80, and therefore limit the range of motion of linkage 34 relative to arm 54. This in turn limits the range of motion of pedal 16 and bracket 18 relative to frame 12 and door 14.

Figure 7:
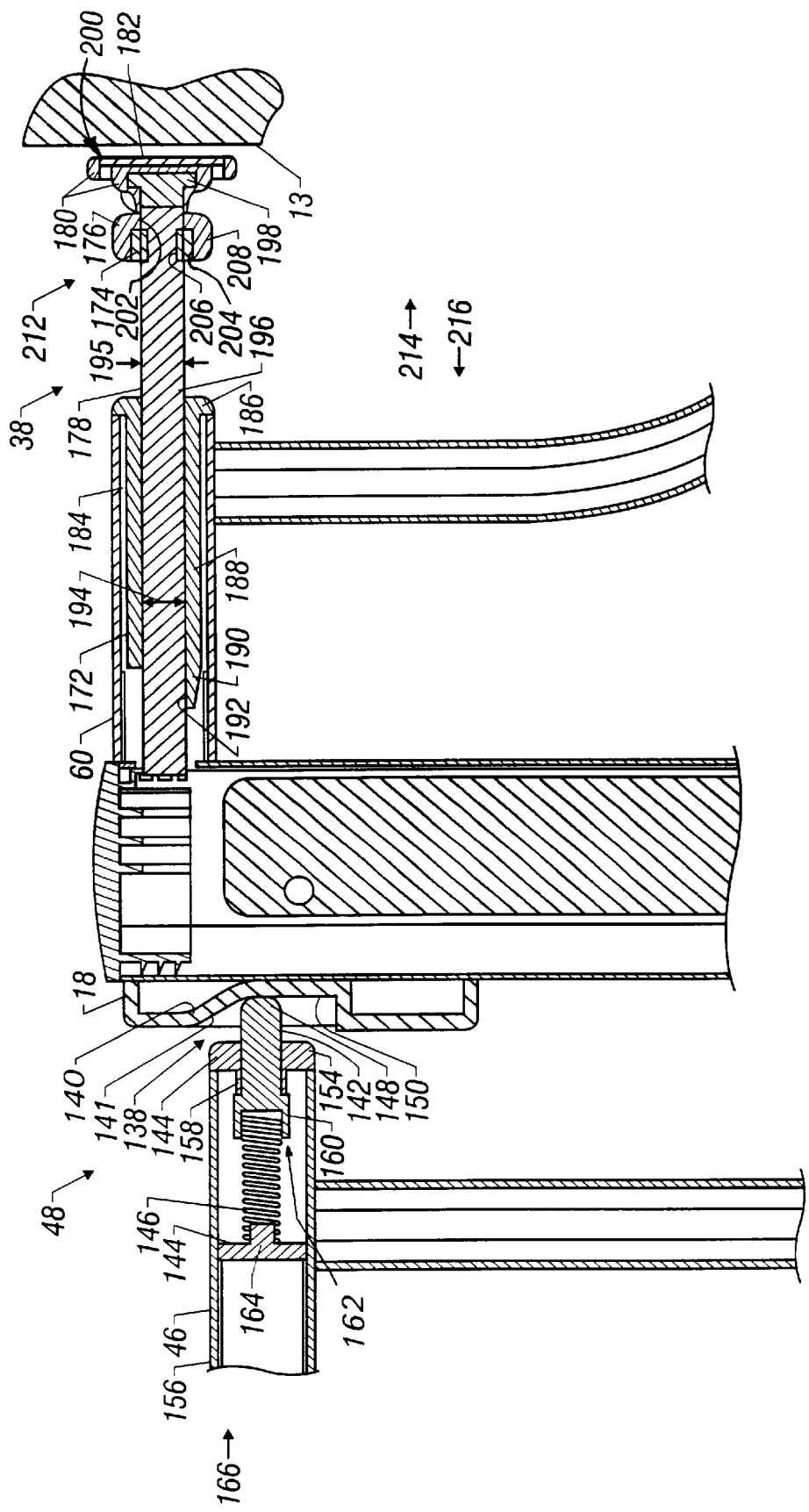
FIG. 7 is an enlarged portion of the cross-sectional view of the safety gate shown in FIG. 3 as indicated by line 7—7, with the bracket shown in FIG. 6 in a locked position.

Referring to FIGS. 2, 6 and 7, door 14 includes barrier 46 and upper and lower assemblies 48 and 50.

Barrier 46 is made of, e.g., plastic and includes two hollow cross members 220 and 222 connected (e.g., sonically welded) to several bars 224. Bars 224 are separated by distances too small for infants of crawling age or older (e.g., older than 4 months) to fit through.

Upper assembly 48 includes a pin 142 adapted to be received by recess 138 of bracket 18, a cap 144 adapted to be received by barrier 46, and a spring 146. Like pin 122, pin 142 as shown has a cylindrical shape, but other types of shapes, such as rectangular, are acceptable. Pin 142 has an end camming surface 148 configured to contact and slide against a wall 150, camming surface 141 of wall 140, and a flat surface 143, of bracket 18. Cap 144 fits inside an opening 152 (FIG. 2) of barrier 46 and has an end portion 154 that butts up against the end of top cross member 220 of barrier 46. Pin 142 slidably fits within a hole 158 in cap 144. A flared region 160 of pin 142 provides a recess 162 for receiving an end of spring 146. The other end of spring 146 fits over a post 164 of cap 144. Spring 146 biases pin 142 in a direction away from pivot access 74 (FIG. 1) and away from barrier 46 and toward bracket 18 in a direction transverse to pivot access 74 as indicated by an arrow 166 (see also FIG. 1). With door 14 in closed position 19 (FIG. 1) as shown, spring 146 biases pin 142 into recess 138.

Referring to FIGS. 2, 3, and 5, lower assembly 50 is configured similarly to upper assembly 48, with spring 126 and pin 122 received by cap 124, and spring 122 biased toward foot pedal 16 and into recess 118. Pin 122, similar to pin 142, has a surface 168 adapted to be a camming surface to engage, interact with, and slide against a bottom surface 170 and surfaces 121 and 123 of pedal 16.

Referring to FIGS. 2 and 7, assembly 38 includes a cap 172, a nut 174, a knob 176, a rod 178, an end piece 180, and a pad 182. Cap 172 fits inside an opening 184 of extension 60 of frame 12 and an end 186 of cap 172 butts up against an end of extension 60. Cap 172 includes a sleeve 188 with a finger 190 having a tab 192 at its end. An inner diameter 194 of sleeve 188 is sized to accommodate an outer diameter 195 of rod 178. Tab 192 is disposed to interfere with rod 178 and finger 190 is adapted to flex to allow tab 192 to be moved to a position such that tab 192 will not interfere with rod 178. Rod 178 has a threaded body 196 extending at least about three inches and over substantially the entire length of rod 178 except for a head 198. Over head 198 and a portion of body 196 is the end piece 180. End piece 180 provides a circular recess 200 into which pad 182 can be inserted and attached, e.g., by an adhesive. Pad 182 is made of e.g., a high friction elastomeric such as rubber. Knob 176 provides an opening 202 for receiving body 196 of rod 178. Knob 176 also provides an opening 204 into which nut 174 can be press fit. Nut 174 provides a threaded inner opening 206 adapted to mesh with threaded body 196 of rod 178. Knob 176 provides an outer surface 208 adapted to be gripped and turned by a user. Three other assemblies similar to assembly 38 are provided (FIG. 1) for insertion into an open end of extension 58 and open ends of cross member 56 (FIG. 1).

Referring to FIG. 2, pad 40 is adapted to be mounted to two bars 224 of barrier 46. Pad 40 is shaped and disposed to be pushed by, e.g., an adult's knee. Pad 40 can be snapped on to bars 224 at various positions.

Frame support 44 is adapted to rest on a flat surface such as the floor and to receive cross member 56 of frame 12. Support 44 provides an opening 210 along its length sized to receive cross member 56 of frame 12.

Figure 9:
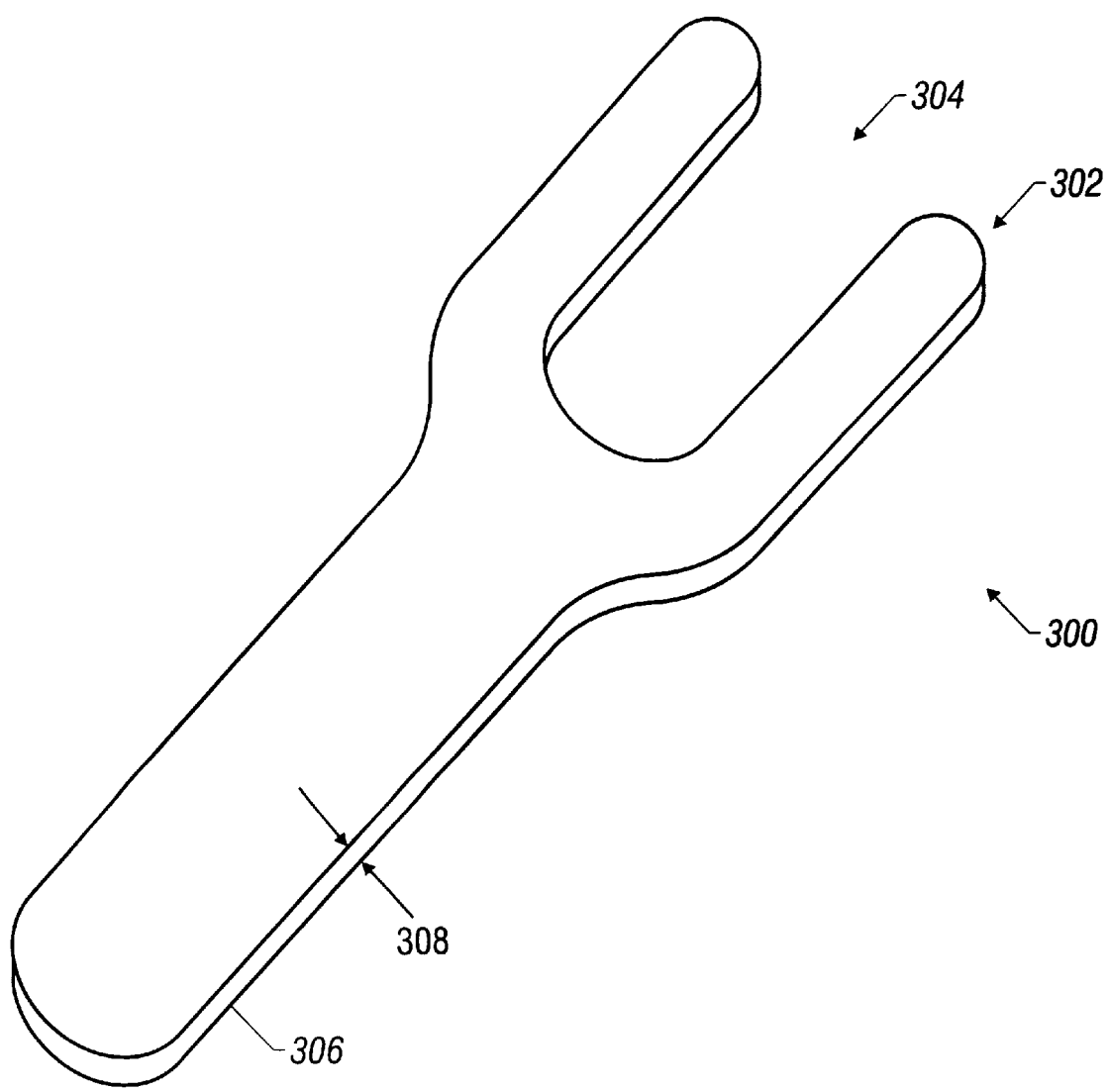
FIG. 9 is a perspective view of a wrench for use with the gate shown in FIG. 1.

A wrench 300, as shown in FIG. 9, is provided with gate 10. Wrench 300 has an open end 302 with an inner opening 304 shaped to receive knob 176 (FIGS. 2 and 7) and to engage outer surface 208 (FIG. 7) of knob 176 so that knob 176 can be turned using wrench 300. Wrench 300 has a flat handle 306 of a thickness 308.

Referring to FIGS. 1–7, pieces of gate 10 can be made as follows. Frame 12 and barrier 46 are welded of steel in the configurations shown. Foot pedal 16, bracket 18, foot pedal support 42, pad 40, and frame support 44 are injection molded acrylonitrile butadiene styrene (ABS). Holes and slots provided by frame 12 can be machined after frame 12 is injection molded or can be formed as part of the injection molding. Caps 172, knobs 176, and end pieces 180 are also molded ABS. Springs 36, 126 and 146 are made of steel, as well as rivets 80 and 84, nut 174, and rod 178.

Gate 10 can be assembled as follows. Linkage 34 is inserted into interior 96 of spring 36. Linkage 34 and spring 36 are inserted into opening 76 of arm 54 and positioned by inserting pins 90 and 92 into holes 86 and 88 respectively. Foot pedal support 42 is fit onto square side 106 of arm 154 and positioned so that hole 102 and hole 104 align with slot 82 and slot 83. Rivet 84 is inserted through hole 102 in support 42, slot 82 in arm 54, hole 98 in linkage 34, slot 83 in arm 54, and hole 104 in support 42, and flattened in a conventional manner. Foot pedal 16 is fit onto rounded side 110 of arm 54 and snapped onto foot pedal support 42. Bracket 18 is fit onto rounded side 110 of arm 54 and rivet 80 inserted through hole 132 in bracket 18, slot 78 in arm 54, hole 128 in linkage 34, slot 79 in arm 54, and hole 134 in bracket 18 and flattened in a conventional manner.

Referring to FIGS. 2 and 7, assembly 38 is assembled and coupled to extension 60. End piece 180 is injection molded over head 198 and pad 182 is glued into recess 200 of end piece 180. Cap 172 is press fit into extension 60. Nut 174 is pressed fit into opening 204 of knob 176 to form a knob assembly 212 (FIG. 7). Rod 178 is inserted through knob assembly 212 by turning rod 178 to thread nut 174 onto body 196 of rod 178. Rod 178 is inserted into sleeve 178 of cap 172. As rod 178 is inserted into sleeve 188, threads on body 196 will interfere with tab 192. Finger 190 will flex to allow tab 192 to move out of the way of threads on body 196 to allow rod 178 to be inserted into sleeve 188. Other assemblies similar to assembly 38 are similarly assembled and coupled to extension 58 and ends of cross member 56 of frame 12.

Pad 40 is snapped to a desired location of bars 224 of barrier 46. Alternatively pad 40 can be permanently fixed by, e.g., sonic welding to barrier 46. Frame 12 is inserted into frame support 44 such that cross member 56 is received by opening 210.

Referring to FIGS. 2, 3, and 7, upper assembly 48 is assembled and coupled to barrier 46, which is coupled to frame 12. Pin 142 is inserted through hole 158 provided in cap 144. Spring 146 is inserted into cap 144 through an opening 244 (FIG. 2) provided in the top of cap 144. Spring 146 is placed into recess 162 of flared end 160 of pin 142 and also placed over post 164 of cap 144. Cap 144 is inserted into opening 152 in an end of barrier 46 and attached to, e.g. by press fitting into, barrier 46. Lower assembly 50 is similarly assembled, inserted into opening 128 in barrier 46, and attached to barrier 46. Barrier 46 is attached, e.g., by riveting, to hinges 20 and 70 (FIG. 1) which are attached to frame 12 e.g., by riveting.

Referring to FIGS. 1–9, in operation, gate 10 is mounted between opposing surfaces and adjusted to fit snugly between the opposing surfaces. To adjust the fit between the opposing surfaces, assembly 38 is adjusted such that pad 182 is pressed firmly against one of the opposing surfaces. Coarse or "macro" adjustment of assembly 38 can be accomplished by pulling rod 178 or pushing rod 178 in directions 214 or 216. This can be accomplished, e.g., by pulling or pushing on knob assembly 212. When rod 178 is pulled or pushed in directions 214 or 216, threads on threaded body 196 of rod 178 will interfere with tab 192, and finger 190 will flex to allow tab 192 to move out of the way of the threads on threaded body 196. Fine or "micro" adjustment of rod 178 in directions 214 or 216 can be accomplished by turning knob assembly 212 (e.g., using wrench 300) in an appropriate direction until assembly butts up against nut 172. Further rotation of assembly 212 in this direction causes threads on nut 174 to mesh and interact with threaded body 196 to move rod 178 in direction 214. Rotation of assembly 212 in the opposite direction will cause rod 178 to move in direction 216. Each of the other three assemblies 38 on gate 10 can be adjusted in similar fashion. Knob assemblies 212 of assemblies 38 at the top of frame 12 are adjusted until arms 52 and 54 move inward (opposite to directions 57 and 59) such that angles 61 and 63 become approximately 90°.

Wrench 300 is used to indicate that gate 10 has been properly secured. Handle 306 is pressed flat against surface 143 of bracket 18 and slid downward toward cross member 56 between bracket 18 and cap 142. When this is done and assemblies 38 at the top of gate 10 are adjusted properly, handle 306 will contact and encounter resistance from (or will not fit between) bracket 18 and cap 142 due to the selected thickness 308 of handle 306. Handle 306 thus provides a feeler gauge that indicates that gate 10 is properly secured between surfaces 11 and 13. When gate 10 is properly secured, at least a desired minimum of static friction exists between pads 182 and surfaces 11 and 13. For example, enough friction may exist such that a force of less than about 40 pounds against gate 10 will be insufficient to slide pads 182 relative to surfaces 11 or 13. Also, when gate 10 is properly secured, pins 142 will be sufficiently received within recesses 138, when gate 10 is in closed position 19, to inhibit undesired opening of gate 10. Assemblies 38 can be adjusted to securely fit gate 10 within passageways of about 29 inches to about 34 inches wide.

Figure 8:
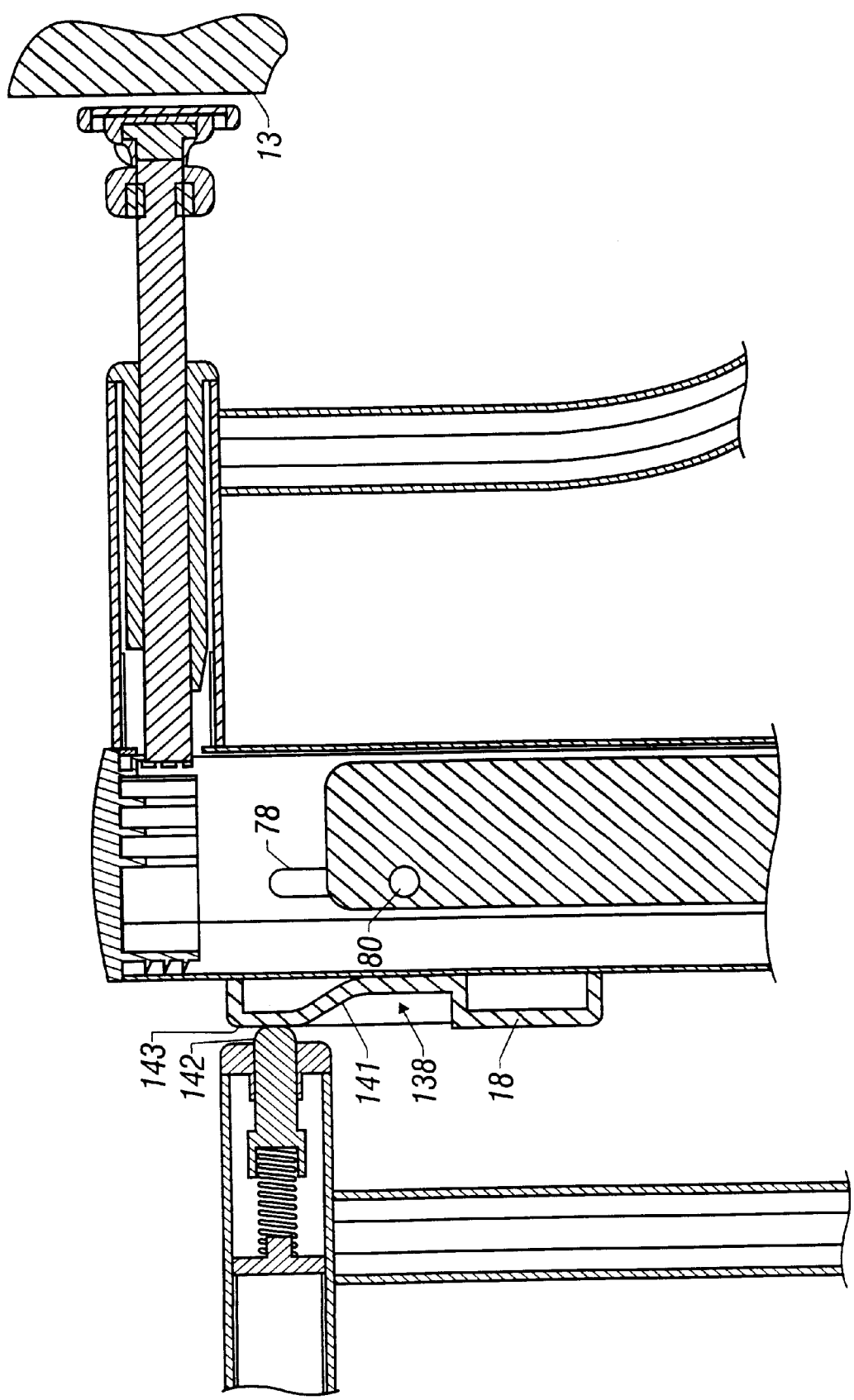
FIG. 8 is view similar to that shown in FIG. 7 but with the bracket shown in FIG. 6 in an unlocked position.

If gate 10 is in a locked position (FIGS. 1 and 7), with door 14 in the closed position 19 and pins 122 and 142 in recesses 118 and 138, door 14 can be moved to an open position by pressing on foot pedal 16 and concurrently pressing on door 14. To remove the pins 142 and 122 from their respective recesses 138 and 118 to unlock door 14, foot pedal 16, foot pedal support 42, and linkage 34 provide an actuator for actuating engagement and relative motion of the camming surfaces 121, 168, 141, and 148. Foot pedal 16 is pressed, e.g., by stepping on foot pedal 16. When a downward force is exerted on foot pedal 16 that exceeds the required force to compress spring 36 (FIGS. 2 and 3), foot pedal 16 will move downward. This also causes linkage 34, and therefore also bracket 18, to move downward. Foot pedal camming surface 121 (FIG. 5) will slide against camming surface 168 (FIG. 2) and push pin 122 toward pivot axis 74, out of recess 118, and onto flat surface 123 (FIG. 5). Similarly, camming surface 141 will slide against camming surface 148 of pin 142, pushing pin 142 out of recess 138 of bracket 18 and onto flat surface 143 as shown in FIG. 8. With pins 122 and 142 no longer in recesses 118 and 138, door 14 is in an unlocked position (FIG. 8) and very little force is needed to move door 14 toward open positions 22 or 24. The user presses against door 14, e.g., against pad 40, to pivot door 14 toward an open position.

If door 14 is in an open position, door 14 can be rotated to the closed position 19 and automatically secured or locked in the closed position 19. Foot pedal 16, foot pedal support 42 (FIG. 2), linkage 34 (FIGS. 2 and 3), bracket 18, and assemblies 48 and 50 (FIG. 2), form a lock for securing door 14 in closed position 19 with respect to frame 12. Door 14 is moved, e.g., by pushing pad 40, toward the closed position 19. As door 14 is rotated from open position 22 toward closed position 19, camming surfaces 148 and 168 of pins 142 and 162 engage with and slide against camming surface 219 (FIG. 6) of bracket 18 and camming surface 220 (FIG. 5) of foot pedal 16, pushing pins 142 and 122 toward pivot axis 74. When door 14 reaches closed position 19, pins 142 and 122 are spring biased into recesses 138 and 118 respectively. Once pins 142 and 122 are in recesses 138 and 118, door 14 is in a locked position and is substantially prevented from pivoting toward an open position unless foot pedal 16 is pressed with a sufficient force to compress spring 36. Similarly, when door 14 is in open position 24, door 14 can be rotated to closed position 19, with engaging surfaces 148 and 168 sliding against and engaging with camming surfaces 218 (FIG. 6) and 222 (FIG. 5) of bracket 18 and foot pedal 16, respectively.

Other embodiments are within the scope and spirit of the appended claims. For example, extension arms can be provided to allow gate 10 to be secured in passageways larger than 34 inches.

What is claimed is:

1. An apparatus comprising:
   a pair of frame members adapted for mounting to opposing surfaces of a passageway;
   a door pivotably mounted to at least one of the frame members for movement between a closed position, in which the door and frame members substantially traverse the passageway, and an open position, in which a portion of the passageway is free of the door and frame members, the portion being large enough to permit passage of an adult therethrough; and
   a lock coupling at least one of the frame members to the door, to retain the door in the closed position, the lock including a foot pedal disposed near a lower portion of the frame members and releasably coupled to the door such that when the foot pedal is depressed by a user's foot in a hands-free operation the lock is released to permit pivoting movement of the door with respect to the frame members from the closed position toward the open position upon application to the foot pedal of a force of at least a predetermined weight of a child.

2. The apparatus of claim 1 wherein the predetermined weight is approximately 40 pounds.

3. The apparatus of claim 1 wherein the lock couples a frame member to the door near both a top of the door and a bottom of the door when the door is in its closed position.

4. The apparatus of claim 1 wherein the foot pedal, when actuated, moves a recess camming surface, defining a portion of a recess, relative to and against a detent camming surface, of a detent that is biased into the recess when the door is in the closed position and the lock is in a locked position, to substantially remove the detent from the recess.

5. The apparatus of claim 4 wherein the door is pivotally mounted to the frame about a pivot axis and the detent is a pin that is biased radially outward from the pivot axis.

6. The apparatus of claim 5 comprising a substantially U-shaped frame including the frame members and a cross member, the frame members being first and second arms forming sides of the U and the cross member connecting the arms and forming a bottom of the U, the door being pivotally attached to the first arm, wherein the actuator includes a bracket slidably carried by the second arm and including the recess camming surface.

7. The apparatus of claim 6 wherein the door includes another pin, and wherein the actuator includes a foot pedal, coupled to the bracket and movably mounted to the frame, including a foot pedal camming surface that provides a wall of a foot pedal recess and that moves relative to and against a pin camming surface, of the another pin that is biased radially outward from the pivot axis and into the foot pedal recess when the door is in the closed position and the lock is in the locked position, to substantially remove the another pin from the foot pedal recess when the foot pedal moves relative to the frame.

8. The apparatus of claim 5 wherein the arms extend away from the cross member and away from each other.

9. A safety gate comprising:
   a substantially U-shaped frame having first and second arms connected by a cross member, the frame providing a passageway between the arms above the cross member;
   a bracket movably coupled to the second arm and providing a bracket recess, a part of the bracket recess being provided by a bracket camming surface;
   a foot pedal coupled to the bracket and movably coupled to the frame near the bottom end of the second arm for movement between a gate-opening position and a gate-locking position;
   a spring coupled to the foot pedal to bias the foot pedal toward its gate-locking position; and
   a door pivotally mounted to the first arm along a pivot axis and including a pin biased away from the pivot axis and configured to be received by the bracket recess, the door substantially preventing an infant from passing through the passageway when the pin is received by the bracket recess;
   wherein when the foot pedal is moved toward said gate-opening position by application of a predetermined force, the bracket camming surface bears against the pin to move the pin substantially out of the bracket recess.

10. The gate of claim 9 wherein the predetermined force is about a weight of a three-year-old child.

11. The gate of claim 9 wherein the bracket and the foot pedal are slidably carried by the second arm.

12. The gate of claim 11 wherein the pin is a first pin, the foot pedal provides a foot pedal recess, partially provided by a foot pedal camming surface, wherein the door includes a second pin biased away from the pivot axis and configured to be received by the foot pedal recess, and wherein when the foot pedal slides relative to the frame in the gate-opening direction, the foot pedal camming surface bears against the second pin to move the second pin substantially out of the foot pedal recess.

13. The gate of claim 9 wherein the passageway extends from a first side of the frame to a second side of the frame, and wherein a portion of the foot pedal is disposed on the first side of the frame and another portion of the foot pedal is disposed on the second side of the frame.

14. The gate of claim 9 wherein the first and second arms are adapted to engage opposing surfaces and extend from the cross member and away from each other such that when the arms are coupled to the surfaces such that the arms extend substantially perpendicular to the cross member, a force of less than about 40 pounds applied to the gate is insufficient to slide either arm relative to a respective one of the surfaces.

15. The apparatus of claim 9 wherein the predetermined force is about 40 pounds.

16. An apparatus for use with a door movably mounted to a frame member between an open position and a closed position, the apparatus adapted to inhibit the door from moving from the closed position toward the open position while in a locked position and to change to an unlocked position to permit the door to move from the closed position toward an open position, the apparatus comprising a foot pedal adapted to be actuated by a force of at least a predetermined weight of a child applied to the foot pedal,
   the door including a door member having a door member camming surface and the apparatus including an apparatus camming surface, the apparatus further adapted to move the apparatus camming surface relative to the door when the force is applied to the apparatus and to remain substantially fixed relative to the door otherwise, the apparatus camming surface configured and disposed to cause one of the camming surfaces, biased into a recess provided at least partially by the other camming surface, to be substantially removed from the recess.

17. The apparatus of claim 16 wherein a portion of the apparatus is adapted to be slidably carried by the frame.

18. The apparatus of claim 17 wherein the apparatus includes a bracket, slidably coupled to the frame, and an actuator to which the force is applied, the bracket including the apparatus camming surface.

19. The apparatus of claim 18 wherein the recess is a first recess, the member is a first member, and the member camming surface is a first member camming surface, and wherein the actuator includes an actuator camming surface configured and disposed to cause one of the actuator camming surface and a second member camming surface of a second member of the door, biased into a second recess provided at least partially by the other one of the actuator camming surface and the second member camming surface, to be substantially removed from the second recess when the force is applied to the apparatus.

20. A gate for selectively blocking a passageway between opposed vertical surfaces, the gate comprising a frame adapted to be positioned between the opposed surfaces to extend across the passageway;

a door pivotably attached to the frame alone one vertical edge of the door and adapted to pivot between open and closed positions;

upper and lower latches for releasably securing the door in its closed position, the upper and lower latches each comprising a pin biased to extend outwardly from the door and a corresponding recess in the frame arranged to receive the pin to secure the door in its closed position; and a foot pedal positioned to actuated by a foot of a user to release both the upper and lower latches to enable the door to be moved to its open position.

21. The gate of claim 20 wherein the door selectively pivots in either of two opposite directions from its closed position.

22. The gate of claim 20 wherein surfaces of the frame forming the recesses are adapted to be displaced upon actuation of the foot pedal so as to depress the pins into the door to release the door from its closed position.

23. The gate of claim 20 wherein the foot pedal is adapted to be actuated by a predetermined force in excess of about 40 pounds.

* * * * *

UNITED STATES PATENT AND TRADEMARK OFFICE
CERTIFICATE OF CORRECTION

PATENT NO.   : 6,176,042 B1
DATED        : January 23, 2001
INVENTOR(S)  : Rossman et al.

It is certified that error appears in the above-identified patent and that said Letters Patent is hereby corrected as shown below:

Title page,
Item [75] Inventors, please add -- Carl J. Conforti, Tiverton, RI --;

Column 5,
Line 27, "hole 128" should be -- hole 129 --;

Column 6,
Line 8, "spring 122" should be -- pin 122 --;

Column 11, claim 18,
Lines 4 and 5, after "frame" remove [, and an actuator to which the force is applied, the bracket]; and insert -- and --;

Column 12, claim 20,
Line 10, after "to" add -- be --

Signed and Sealed this

Fifteenth Day of January, 2002

JAMES E. ROGAN
*Director of the United States Patent and Trademark Office*

*Attest:*

*Attesting Officer*